D. H. HUTCHINS.
MACHINE FOR CATCHING AND DESTROYING GRASSHOPPERS.
No. 187,012. Patented Feb. 6, 1877.
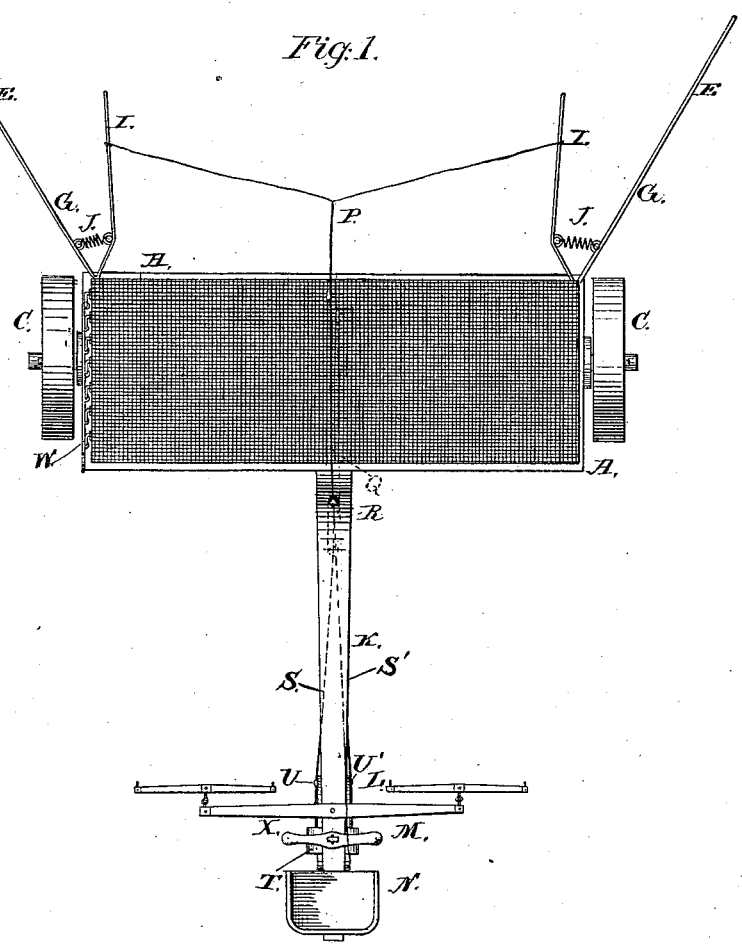
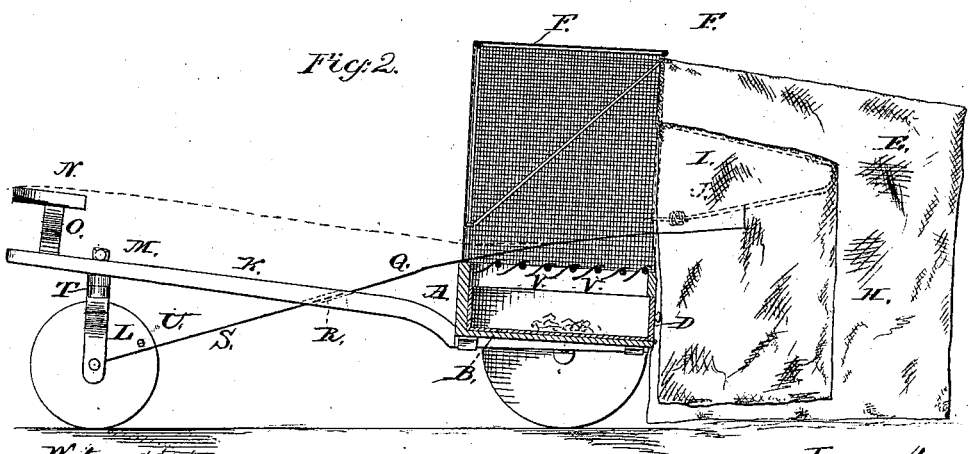

UNITED STATES PATENT OFFICE.

DEXTER H. HUTCHINS, OF ALGONA, IOWA.

IMPROVEMENT IN MACHINES FOR CATCHING AND DESTROYING GRASSHOPPERS.

Specification forming part of Letters Patent No. 187,012, dated February 6, 1877; application filed October 9, 1876.

*To all whom it may concern:*

Be it known that I, DEXTER H. HUTCHINS, of town of Algona, in the county of Kossuth and State of Iowa, have invented certain new and useful Improvements in Machines for Catching and Destroying Grasshoppers; and I do hereby declare that the following is a full, clear, and exact description thereof, which will enable others skilled in the art to which it appertains to make and use the same, reference being had to the accompanying drawings, and to letters of reference marked thereon, which form a part of this specification.

Figure 1 is a top view, and Fig. 2 is a sectional view, of my invention.

This invention relates to certain improvements in machines for catching and destroying grasshoppers; and consists in the improvements in the construction of the same, hereinafter described and claimed.

In the accompanying drawings, similar letters of reference indicate like parts in the invention.

The frame A has a wooden bottom, B, and is mounted upon wheels C C. A drawer, D, is made in the front of the frame A, and opens to the front between the flies E E, attached to the frame F so as to project at an angle of about forty-five degrees outwardly from the frame F. The flies E E consist of wire frames G G, covered with canvas H, and are secured to the front uprights of the frame F, which is also of wire. Draw-flies I I are hinged to the front standards of the frame F, and are connected with the frames G G by spiral springs J J, which hold them open.

The frame F has its top ends and rear side covered with wire-gauze. A tongue, K, leads from the rear of the frame A, is supported at its rear end upon a caster-wheel, L, the shank of which penetrates the tongue K, and is provided with a foot-lever, M. A driver's seat, N, resting upon a spring, O, is secured to the tongue at its rear end, in a position to permit the driver to operate the foot-lever M. A cord, P, connects the draw-flies I I, and a cord, Q, attached to the cord P at its center, leads to a slot, R, in the tongue K, where it connects with two cords, S S'. The cords S S' are secured, one to each side of the frame T, in which the caster-wheel L has its bearings. Pins U U' are fixed in opposite sides of the wheel L near its periphery. Metallic slats V are pivoted longitudinally on the frame A, and are connected at one end by the rod W. A single-tree, X, is secured to the tongue K, slightly in front of the foot-lever M. The horses are harnessed to the machine with their heads facing the frame A.

The operation of the invention is as follows: The slats V are left partially open, and the machine driven over the infested field. The grasshoppers rise from the ground, and are drawn or driven into the frame F by the draw-flies I I, which are closed every revolution of the wheel L by the pins U or U', engaging with the cords S or S', as the case may be, both pins engaging when the wheel L is straight, but only one when it is turned to either side to guide the machine.

The pins U and U' are beveled on their rear sides, and the cords S and S' slip from said pins, when the pins are at the rear of the wheels and in line with the bearings of the same, and permit the draw-flies to open by the spiral springs J J.

The pins U U' and cords S S' may be dispensed with, if desired, and the cord Q may be extended to the driver's seat and there operated by hand.

When the space beneath the metal slats V in the frame A has been filled with the insects, the slats V should be closed, and the drawer D, previously supplied with sulphur, opened, the sulphur ignited, and the drawer closed. The fumes of the sulphur will destroy the grasshoppers, after which the machine may be cleaned and the operation repeated.

Having thus described my invention, what I claim as new, and desire to secure by Letters Patent, is—

1. In combination with the frame A, having the metal slats V, and a suitable receptacle placed below them, the flies E E, draw-flies I I, and frame F, covered with wire-gauze, substantially as and for the purposes set forth.

2. The draw-flies I I, connected to the frames G G by the spiral springs J J, and provided with the cords P and Q, substantially as and for the purposes set forth.

3. The draw-flies I I, connected to the frames G G by the spiral springs J J, in combination with the cords P Q and S S', and the wheel L, provided with the pins U U', substantially as and for the purposes set forth.

In testimony that I claim the foregoing as my own I affix my signature in presence of two witnesses.

DEXTER H. HUTCHINS.

Witnesses:
JOHN F. C. PREINKERT,
FRANK SMITH.